US011880825B2

(12) United States Patent
Jamkhedkar et al.

(10) Patent No.: US 11,880,825 B2
(45) Date of Patent: Jan. 23, 2024

(54) USING A CONSUMER DIGITAL WALLET AS A PAYMENT METHOD IN A MERCHANT DIGITAL WALLET

(71) Applicant: PAYPAL, INC., San Jose, CA (US)

(72) Inventors: Prashant Jamkhedkar, Fremont, CA (US); Abhijeet Arvind Ranadive, San Jose, CA (US); Patrick Babcock, Sturbridge, MA (US); Haoyu Xue, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/490,518

(22) Filed: Sep. 30, 2021

(65) Prior Publication Data

US 2022/0020004 A1   Jan. 20, 2022

Related U.S. Application Data

(63) Continuation of application No. 15/710,608, filed on Sep. 20, 2017, now Pat. No. 11,151,547.

(51) Int. Cl.
*G06Q 20/36* (2012.01)
*G06Q 20/38* (2012.01)
*G06Q 20/40* (2012.01)

(52) U.S. Cl.
CPC ....... *G06Q 20/3674* (2013.01); *G06Q 20/382* (2013.01); *G06Q 20/385* (2013.01); *G06Q 20/40* (2013.01); *G06Q 20/4016* (2013.01)

(58) Field of Classification Search
CPC ................... G06Q 20/00–425; H04L 9/00–50
See application file for complete search history.

(56) References Cited

U.S. PATENT DOCUMENTS 9,652,770 B1    5/2017 Kurani et al.
2007/0276765 A1* 11/2007 Hazel ................. G07F 19/206
                                                      705/71

(Continued)

FOREIGN PATENT DOCUMENTS

CN    102017578 A    4/2011
CN    103718200 A    4/2014

(Continued)

OTHER PUBLICATIONS

Extended European Search Report for European Application No. 18859552.4, dated May 19, 2021, 8 pages.

(Continued)

*Primary Examiner* — Ari Shahabi
(74) *Attorney, Agent, or Firm* — Haynes and Boone, LLP

(57) ABSTRACT

A system is configured to perform operations that include receiving a purchase request to use a consumer digital wallet account of a user to pay for an item sold by a merchant, the consumer digital wallet account being included as a payment method in a merchant digital wallet account provided by the merchant to the user. The operations further include generating a single-use payment token based on a non-transactable token. Additionally, the operations include transmitting, to an existing card payment network, a card transaction message that includes the single-use payment token, the single-use payment token causing the existing card payment network to route the card transaction message back to the system. The operations also include causing payment to be remitted from the user to the merchant using a payment method included in the consumer digital wallet account.

20 Claims, 6 Drawing Sheets

(56) References Cited

U.S. PATENT DOCUMENTS

| | | |
|---|---|---|
| 2008/0148235 A1 | 6/2008 | Foresti et al. |
| 2011/0125569 A1 | 5/2011 | Yoshimura et al. |
| 2012/0310838 A1* | 12/2012 | Harris .................. G06Q 20/384 |
| | | 705/65 |
| 2013/0212007 A1* | 8/2013 | Mattsson ........... G06Q 20/4014 |
| | | 705/39 |
| 2014/0039990 A1 | 2/2014 | Georgi |
| 2014/0344149 A1 | 11/2014 | Campos |
| 2015/0032625 A1 | 1/2015 | Dill et al. |
| 2015/0112870 A1* | 4/2015 | Nagasundaram .... G06Q 20/385 |
| | | 705/67 |
| 2015/0142595 A1 | 5/2015 | Acuna-Rohter |
| 2015/0186871 A1 | 7/2015 | Laracey |
| 2015/0199689 A1 | 7/2015 | Kumnick et al. |
| 2015/0254665 A1 | 9/2015 | Bondesen et al. |
| 2016/0042328 A1* | 2/2016 | Teckchandani ........ G06Q 20/26 |
| | | 705/44 |
| 2016/0092869 A1 | 3/2016 | Salama et al. |
| 2017/0109741 A1 | 4/2017 | Heiman et al. |

FOREIGN PATENT DOCUMENTS

| | | |
|---|---|---|
| CN | 104737189 B | 5/2021 |
| WO | 2012075417 A1 | 6/2012 |
| WO | 2014117095 A1 | 7/2014 |
| WO | 2015023305 A1 | 2/2015 |
| WO | 2017035399 A1 | 3/2017 |

OTHER PUBLICATIONS

International Search Report and Written Opinion for International Application No. PCT/US2018/051824 dated Dec. 6, 2018, 7 pages.
International Search Report and Written Opinion for Singapore Application No. 10201908563T dated Mar. 30, 2020, 7 pages.

* cited by examiner

USING A CONSUMER DIGITAL WALLET AS A PAYMENT METHOD IN A MERCHANT DIGITAL WALLET

CROSS REFERENCE TO RELATED APPLICATIONS

This application is a continuation of U.S. patent Ser. No. 15/710,608, filed Sep. 20, 2017, which is incorporated by reference in its entirety.

BACKGROUND

Digital wallets that store different payment methods for a user have recently become more popular. As such, various types of digital wallet options may be available for a user. For instance, the consumer may have a consumer digital wallet account with a payment provider that can be accessed or used with various merchants. As another example, the consumer may have a merchant digital wallet account that is maintained with a specific merchant. The consumer accesses or uses the merchant digital wallet account whenever the consumer shops with or purchases an item from the specific merchant. In certain situations, the consumer may desire the ability to access or use a consumer digital wallet account as a payment method within the merchant digital wallet account.

Figure 1:
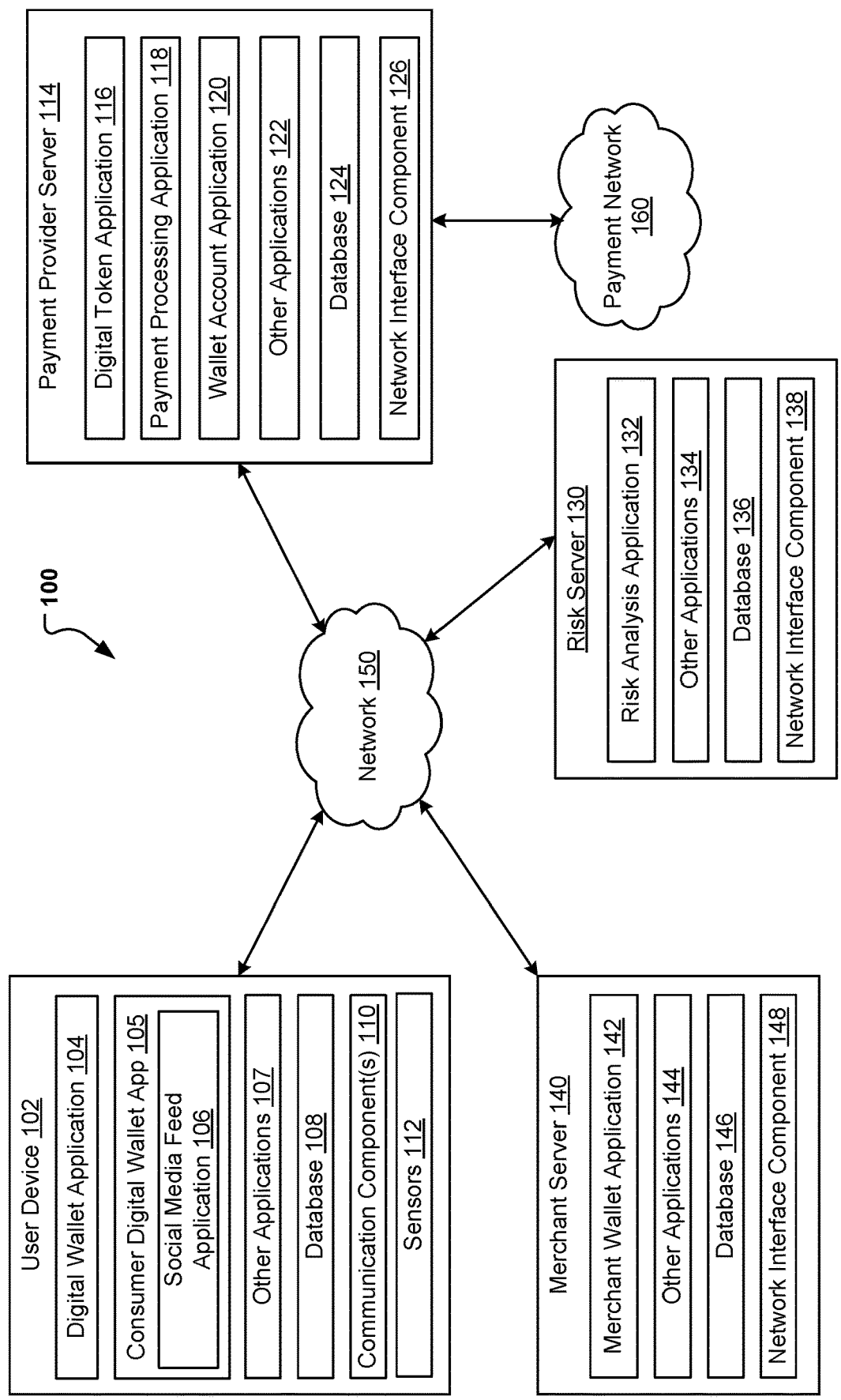
FIG. 1 is a block diagram of a networked system suitable for implementing the processes described herein for using a consumer digital wallet as a payment method from within a merchant digital wallet.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for using a consumer digital wallet account as a payment method within a merchant digital wallet account. According to certain embodiments, the consumer digital wallet account may be provided to a user by a payment provider. For example, the user may have previously registered the consumer digital wallet account with a payment provide server associated with the payment provider. The payment provider server may be configured to process payment transactions related to using the consumer digital wallet account as a payment method. In other embodiments, the consumer digital wallet account may be provided to the user by a consumer wallet provider that is different from the payment provider. In such embodiments, a consumer wallet provider server may communicate with the payment provider server to facilitate certain payment transactions that use the consumer digital wallet account as a payment method. For example, as described in more detail below with respect to FIGS. 1-5, the payment provider server maybe configured to route certain payment transactions to the consumer wallet provider server, which may be configured to process those payment transactions.

The consumer digital wallet account may store one or more payment methods for the user that the user can access at different merchant sites at which the consumer digital wallet account is accepted. As used herein, payment methods may include, but are not limited to, credit cards, debit cards, gift cards, internal balances with the payment provider, balances with other payment providers, coupons, electronic checks, cryptocurrencies, and incentives. The user may be able to access the consumer digital wallet account using a website hosted by the payment provider and/or using a consumer digital wallet application (provided by the payment provider) executing on a user device of the user.

In some implementations, the consumer digital wallet account may be associated with a social media feed that the user can access, post to, and view. The social media feed may display information (e.g., icons, emoji, text, etc.) related to payment transactions that user has participated with other users that have consumer digital wallet account with the payment provider. For example, if a user participates in a particular payment transaction with a second user, a corresponding post detailing aspects of the particular payment transaction may be automatically posted on the social media feed of the user and/or the second user. Additionally, the social media feed of the user may also include posts of payment transactions between other users (e.g., transactions in which the user did not participate), such as between other users that are included in a contact list of the user, or between other users located within a vicinity of the user.

Furthermore, the user may be provided a merchant digital wallet account by a merchant. The merchant digital wallet account may be accessible by the user when the user shops with the merchant, such as when the user visits a website of the merchant or using a merchant digital wallet application provided by the merchant. To this end, the user may store one or more methods of payment within the merchant digital wallet account for purchase transactions the user makes with the merchant. Furthermore, different users may have their own respective merchant digital wallet accounts with the merchant, and each of the merchant digital wallet accounts may store different payment methods of their respective users.

According to certain embodiments, the user may desire to add the consumer digital wallet account as a payment method to store within the merchant digital wallet account. For example, the user may initiate a request, via the user device, to add the consumer digital wallet account as a payment method to the merchant digital wallet account. In some implementations, the user may initiate the request via the consumer digital wallet application while in other implementations, the user may initiate the request via the merchant digital wallet application.

The request may include a account identifier associated with the consumer digital wallet account. In addition, the user device may transmit device information associated with the user device to the merchant server. The device information may include model information, an operating system version, language information, a device identifier, location information, and/or the like. Further, the device information may be included in the request or may be transmitted separately from the request.

The merchant server may receive the request and the device information and forward the account identifier and the device information to a payment provider system of the payment provider (which maintains the consumer digital wallet account for the user). Based on the account identifier and the device information of the user device, the payment provider system may perform a risk assessment of the request to add the consumer digital wallet account to the merchant digital wallet account. In response to determining, based on the risk assessment, that the request is approved, the payment provider system generates an electronic non-transactable token (NTT) corresponding to the consumer digital wallet account. In some implementations, the NTT may be a random string of alphanumeric characters that represents the consumer digital wallet account. Further, the NTT is unusable for payment (e.g., the NTT is unusable and/or unrecognizable by a payment network used to process payment transactions) and does not include any financial information related to the user nor data related to any financial instrument of the user. In addition, the presence of the NTT may indicate that consumer digital wallet account is valid payment option of the user within the merchant digital wallet account.

The NTT may be stored, in association with the account identifier, in a secure database separate from the merchant server. Moreover, the secure database is inaccessible by the merchant servers, and merchant, merchant severs, and/or any other device of the merchant do not have access rights to the secure database. However, the secure database is still accessible by the payment provider system. In addition, the NTT may also be transmitted to the merchant servers and stored on the merchant servers.

Subsequent to the generation and storage of the NTT, the user may initiate a purchase request to purchase an item from the merchant. The purchase request may indicate a selection of the consumer digital wallet account from the merchant digital wallet account as a payment method to complete the transaction. The purchase request may be received by the merchant server, and the merchant server may forward the purchase request to the payment provider system. The purchase request may include the account identifier of the user that is associated with the consumer digital wallet account. As such, the payment provider system may use the account identifier to retrieve the NTT from the secure database. As previously discussed, the existence of the NTT may indicate that the consumer digital wallet account is a valid payment method within the merchant digital wallet account.

Since the NTT is unusable for payment, the payment provider system may generate a single-use payment token based on the NTT. The single-use payment token may be another electronic token that is different from the NTT. Additionally, an association between the single-use payment token and the NTT may be stored in the secure database. Thus, the secure database may store associations between the NTT, the account identifier, and the single-use payment token. Further, the single-use payment token may include another set of random alphanumeric characters. Similar to the NTT, the single-use payment token does not include any financial information related to the user nor data related to any financial instrument of the user. However, in contrast to the NTT, the single-use payment token is usable for a single payment transaction (e.g., the purchase request). Therefore, after the purchase request is processed using the single-use payment token, the single-use payment token is no longer usable for subsequent purchase transactions.

The payment provider system may transmit a card transaction message that includes the single-use payment token to an existing payment network. In certain implementations, the existing payment network may be a credit/debit card payment network, and the single-use payment token may include a bank identification number (BIN) that corresponds to the payment provider and/or payment provider system. The card transaction message may be a card authorization message (e.g., an International Organization for Standardization (ISO) 8583 car authorization message) that represents a message format for authorization of credit/debit cards over the exiting payment network.

Based on the BIN include in the single-use payment token, the card transaction message may be routed back to payment provider system after being transmitted to the existing card payment network. Thus, payment provider system may in effect emulate the consumer digital wallet account as a typical credit/debit card and leverage an existing mechanism in place that is already used to process credit/debit card transactions (e.g., routing the card transaction message through the existing payment network). Further, in a typical credit/debit card transaction, the existing payment network routes the card transaction message to an issuer that is a different financial institution than the financial institution associated with the merchant. Present embodiments, as previously discussed, enable the card transaction message to be routed back to the payment provider system, with the payment provider providing the role of an issuer.

After the card transaction message is routed back to the payment provider system, the payment provider system may determine the account identifier using the single-use payment token. For example, based on accessing the secure database, the payment provider system may identify the NTT that is associated with the single-use payment token. Further, the payment provider system may determine that the NTT is associated with the account identifier.

Based on the account identifier, the payment provider system may retrieve wallet information corresponding to the consumer digital wallet account, such as a default payment method, wallet balance, payment history, and/or the like. Using the wallet information and/or other information (e.g., merchant information, transaction information such as purchase amount, date, etc.), the payment provider system may execute a risk analysis process with respect to the purchase request. In response to determining, based on the risk analysis process, that the purchase request is authorized, the payment provider system may cause payment from the user to the merchant using the consumer digital wallet account.

Further, according to certain embodiments, the user device may be configured to generate a post corresponding to the purchase transaction with the merchant on the social media feed of the consumer digital wallet account. For example, the user device may automatically generate particular text, icons, emoji, and/or the like in response to the purchase transaction being processed. Further, the particular text, icons, emoji, and/or the like that are posted my depend on the specific merchant corresponding to the purchase transaction. In other implementations, the particular text, icons, emoji, and/or the like maybe manually input by the user.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, wearable devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a user device 102 configured to interface with a user, a payment provider server 114, a merchant server 120, and a risk server 130, which may be in communication with each other over a network 150. In addition, the payment provider server 114 may be in communication with a payment network 160. The user device 102, the payment provider server 114, the merchant server 120, and the risk server 130 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The user device 102 may be implemented as a communication device that may utilize appropriate hardware and software configured for wired and/or wireless communication with the payment provider server 114, the merchant server 120, and/or the risk server 130. The user device 102 may be located at a physical location of a merchant (e.g., a merchant location) and may be configured to facilitate payment for products or services sold by the merchant at the merchant location. For instance, the user device 102 may be configured to accept various forms of payment, including, but not limited to credit card payments, debit card payments, loyalty card payments, gift card payments, store card payments, and/or payment made by accessing a digital wallet.

The user device 102 may include a digital wallet application 104, other applications 107, a database 108, communication components 110, and sensors 112. The digital wallet application 104 and other applications 107 may correspond to executable processes, procedures, and/or applications with associated hardware. In other embodiments, user device 102 may include additional or different components having specialized hardware and/or software to perform operations associated with the digital wallet applications 104 and/or the other applications 107.

The digital wallet application 104 may be provided and maintained by the merchant associated with the merchant server 140. In certain embodiments, the digital wallet application 104 may provide an interface for the user to access a merchant digital wallet account that the user maintains with the merchant. The merchant digital wallet account may store one or more payment methods of the user for purchase transactions specifically between the user and the merchant. As previously discussed, the payment methods may include, but are not limited to, credit cards, debit cards, gift cards, internal balances with the payment provider, balances with other payment providers, coupons, electronic checks, cryptocurrencies, and incentives.

According to one or more embodiments, the merchant digital wallet account may also be configured to store a consumer digital wallet account of the user as a payment method. The consumer digital wallet account may be provided to the user by the payment provider (e.g., of the payment provider server 114). The consumer digital wallet account may also store one or more payment methods within the consumer digital wallet account, and the consumer digital wallet account may be used by the user to pay for items sold by any merchants that accept the consumer digital wallet account. The consumer digital wallet account may also facilitate other types of financial transactions associated with banking, online payments, money transfers, and/or the like.

The user device 102 may also include a consumer digital wallet application 105 that may be provided by the payment provider. The consumer digital wallet application 105 may provide the user direct access to the consumer digital wallet account. Additionally, the consumer digital wallet application 105 may facilitate payments between the user and other users that have other consumer digital wallet accounts with the payment provider. Further, after the consumer digital wallet account has been added as a payment method to the merchant digital wallet account, the user may pay the merchant via the consumer digital wallet account. In some implementations, the consumer digital wallet application 105, after being used by the user as a payment method in a purchase transaction with the merchant, may be configured to split payment of the purchase transaction with other users having consumer digital wallet accounts with the payment provider.

According to certain embodiments, the consumer digital wallet application 105 may include a social media feed application 106. The social media feed application 106 may manage a social media feed of the user corresponding to the consumer digital wallet account. As previously discussed, the social media feed may display information (e.g., icons, emoji, text, etc.) related to payment transactions that user has participated with other users that have consumer digital wallet account with the payment provider. For example, the social media feed application 106 may automatically generate particular text, icons, emoji, and/or the like in response to the payment transactions being processed between the user and the other users. Additionally, the social media feed application 106 of the user may be configured to access and display posts of payment transactions between other users (e.g., transactions in which the user did not participate), such as between other users that are included in a contact list of the user, or between other users located within a vicinity of the user. Furthermore, after the consumer digital wallet account has been added as a payment method to the merchant digital wallet account, social media feed application 106 may generate particular text, icons, emoji, and/or the like in response to the payment transactions being processed between the user and the merchant.

The user device 102 may execute the other applications 107 to perform various other tasks and/or operations corresponding to the user device 102. For example, the other applications 107 may include security applications for implementing client-side security features, programmatic client applications for interfacing with appropriate application programming interfaces (APIs) over network 150 and/or payment network 160, or other types of applications. The other applications 107 may also include additional communication applications, such as email, texting, voice, and instant messaging (IM) applications that enable a user to send and receive emails, calls, texts, and other notifications through the network 150. In various embodiments, the other applications 107 may include location detection applications, such as a mapping, compass, and/or global positioning system (GPS) applications, which may be used to determine a location of the user device 102. The other applications may 107 include social networking applications. Additionally, the other applications 107 may include device interfaces and other display modules that may receive input and/or output information. For example, the other applications 107 may include a graphical (GUI) configured to provide an interface to the user.

The user device 102 may further include a database 108, which may be stored in a memory and/or other storage device of the user device 102. The database 108 may include, for example, identifiers (IDs) such as operating system registry entries, cookies associated with the digital wallet application 104 and/or other applications 107, IDs associated with hardware of the communication component 110, IDs used for payment/user/device authentication or identification, and/or other appropriate IDs. According to a particular embodiment, the database 108 may also store a merchant identifier associated with the merchant, a location identifier associated with the merchant location, and/or a POS identifier associated with the user device 102. The database 108 may also include information corresponding to one or purchase transactions of customers who have purchased goods or services from the merchant, browsing histories of the customers, or other types of customer information. In certain embodiments, the user device 102 may also include information corresponding to payment tokens, such as payment tokens generated by the payment provider server 114. Further, the database 108 may store login credentials, contact information, biometric information, and/or authentication information.

The user device 102 may also include at least one communication component 110 configured to communicate with various other devices such as the merchant server 140 and/or the payment provider server 114. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The user device 102 may also include one or more hardware sensors 112 to determine user inputs from the user 170, motion of the user device 102, biometric information associated with the user 170, and/or various environmental data associated with the user device 102. The sensors 112 may include, but are not limited to, gyroscopes, cameras, microphones, accelerometers, barometers, thermometers, compasses, magnetometers, light detectors, proximity sensors, fingerprint sensors, pedometers, and heart rate monitors.

The merchant server 140 may be maintained, for example, by a merchant and may be in communication with the payment provider, which may provide payment processing services for the merchant. However, in other embodiments, the merchant server 140 may be maintained by or include a financial service provider, social networking service, email or messaging service, media sharing service, and/or other service provider, which may provide payment processing services.

The merchant server 140 includes a merchant wallet application 142, which may be executed by the merchant server 140 to provide the user access to the merchant digital wallet account. For instance, the merchant wallet application 142 may receive requests from the user device 102 to add the consumer digital wallet account as a payment method within the merchant digital wallet account. Further, after the consumer digital wallet account has been added as a payment method, the merchant digital wallet account may also receive a purchase request from the user device 102 to use the consumer digital wallet account as a payment method to purchase an item from the merchant on behalf of the user. The merchant wallet application 142 may be configured to forward these requests to the payment provider server 114. In certain embodiments, the merchant wallet application 142 may also be configured to transmit other information about a purchase request to the payment provider server 114, such as merchant information (e.g., merchant name, merchant location, merchant transaction history, and/or the like) and transaction information associated with the purchase request (e.g., item number, item category, purchase amount, purchase history of the user, and/or the like).

The merchant server 140 may execute the other applications 144 to perform various other tasks and/or operations corresponding to the payment provider server and/or the user device 102. For example, the other applications 144 may include security applications for implementing server-side security features, programmatic client applications for interfacing with appropriate application programming interfaces (APIs) over network 150, or other types of applications. The other applications 144 may also include additional communication applications, such as email, texting, voice, and instant messaging (IM) applications that enable a user to send and receive emails, calls, texts, and other notifications through the network 150. In various embodiments, the other applications 144 may include location detection applications, such as a mapping, compass, and/or global positioning system (GPS) applications, which may be used to determine a location of the user device 102. The other applications may 144 include social networking applications. Additionally, the other applications 144 may include device interfaces and other display modules that may receive input and/or output information. For example, the other applications 144 may include a GUI configured to provide an interface to the user.

The merchant server 140 may further include a database 146, which may be stored in a memory and/or other storage device of the merchant server 140. The database 146 may include, for example, IDs such as operating system registry entries, cookies associated with the payment processing application 118, biometric information, IDs associated with hardware of the network interface component 148, IDs used for payment/user/device authentication or identification, and/or other appropriate IDs. According to a particular embodiment, the database 146 may also store a merchant identifier associated with the merchant, a location identifier associated with the merchant location, and/or a POS identifier associated with the user device 102.

In various embodiments, the merchant server 140 also includes at least one network interface component 148 that is configured to communicate with the user device 102 and/or the payment provider server 114 via the network 150 and/or the payment network 160. For example, according to a particular embodiment, the merchant server 140 may receive voice communication information from the user device 102 via the network interface component 148. The network interface component 148 may comprise a DSL modem, a payment provider server 114TN modem, an Ethernet device, a broadband device, a satellite device and/or various other types of wired and/or wireless network communication devices including microwave, RF, and IR communication devices.

The payment provider server 114 may be maintained, for example, by the payment provider, which may provide payment processing services for the merchant. In one example, the payment provider server 114 may be provided by PAYPAL, Inc. of San Jose, consumer digital wallet account, USA. However, in other embodiments, the payment provider server 114 may be maintained by or include a financial service provider, social networking service, email or messaging service, media sharing service, and/or other service provider, which may provide payment processing services.

The payment provider server 114 includes a digital token application 116 that may be configured to generate and store a non-transactable token (NTT) indicating that the consumer digital wallet account is a valid payment method for the merchant digital wallet account. The digital token application 116 may generate the NTT in response to a request (e.g., from the user device 102 and/or merchant server 120) to add the consumer digital wallet account to the merchant digital wallet account. Further, the digital token application 116 may be configured to generate a single-use payment token corresponding to the consumer digital wallet account in response to a purchase request to use the consumer digital wallet account as a payment method for purchasing an item sold by the merchant. The digital token application 116 is discussed in more detail below with respect to FIGS. 2-5.

The payment provider server 114 may also include a payment processing application 118. The payment processing application 118 may be configured to generate transaction messages that include tokens generated by the digital token application 116 (e.g., the single-use payment token). The transaction messages may correspond to purchase requests from the user device to use the consumer digital wallet account as a payment method. The payment processing application 118 may communicate with the payment network 160 to process payment transactions via the transaction messages. According to certain embodiments, the transaction messages may be card transaction messages and the payment network 160 may be a credit/debit payment network used to process credit/debit payments. The payment processing application 118 is discussed in more detail below with respect to FIGS. 2-5.

Further, the payment provider server 114 may include a wallet account application 120. The wallet account application 120 may be configured to access information associated with the consumer digital wallet account including, but not limited to, an account balance information, transaction history information of the user with respect to the consumer digital wallet account, payment methods stored by the user within the consumer digital wallet account, default payment methods, contact information of the user, contact list information of the user, and/or other types of information. In certain embodiments, the wallet account application 120 may provide such information (or at least portions thereof) to the risk server 130 (e.g., the risk analysis application 132), which may execute a risk analysis process with respect to the provided information associated with the consumer digital wallet account. In certain embodiments, the wallet account application 120 may also be configured to communicate with the social media feed application 106 of the user device 102 to maintain the social media feed of the user. The wallet account application 120 is discussed in more detail below with respect to FIGS. 2-5.

In certain embodiments, the wallet account application 120 may be executed by a different server than the payment provider server 114. For example, the wallet account application 120 may be executed by the consumer wallet provider server dedicated to managing the consumer digital wallet account of various users of the payment provider. The consumer wallet provider server may be in communication with the payment provider server 114 and the user device 102, such as via the network 150.

The payment provider server 114 may execute the other applications 140 to perform various other tasks and/or operations corresponding to the payment provider server and/or the user device 102. For example, the other applications 140 may include security applications for implementing server-side security features, programmatic client applications for interfacing with appropriate application programming interfaces (APIs) over network 150, or other types of applications. The other applications 140 may also include additional communication applications, such as email, texting, voice, and instant messaging (IM) applications that enable a user to send and receive emails, calls, texts, and other notifications through the network 150. In various embodiments, the other applications 140 may include location detection applications, such as a mapping, compass, and/or global positioning system (GPS) applications, which may be used to determine a location of the user device 102. The other applications may 140 include social networking applications. Additionally, the other applications 140 may include device interfaces and other display modules that may receive input and/or output information. For example, the other applications 140 may include a GUI configured to provide an interface to the user.

The payment provider server 114 may further include a database 124, which may be stored in a memory and/or other storage device of the payment provider server 114. The database 142 may include, for example, IDs such as operating system registry entries, cookies associated with the payment processing application 118, biometric information, IDs associated with hardware of the network interface component 126, IDs used for payment/user/device authentication or identification, and/or other appropriate IDs. According to a particular embodiment, the database 124 may also store a merchant identifier associated with the merchant, a location identifier associated with the merchant location, and/or a POS identifier associated with the user device 102.

In various embodiments, the payment provider server 114 also includes at least one network interface component 126 that is configured to communicate with the user device 102, risk server 130, and/or merchant server 140 via the network 150 and/or the payment network 160. The network interface component 146 may comprise a DSL modem, a payment provider server 114TN modem, an Ethernet device, a broadband device, a satellite device and/or various other types of wired and/or wireless network communication devices including microwave, RF, and IR communication devices.

The risk server 130 may be maintained, for example, by a merchant and may be in communication with the payment provider, which may provide payment processing services for the merchant. However, in other embodiments, the risk server 130 may be maintained by or include a financial service provider, social networking service, email or messaging service, media sharing service, and/or other service provider, which may provide payment processing services.

The risk server 130 includes a risk analysis application 132, which may be executed by the risk server 130 to execute a risk analysis process with respect to the purchase request (e.g., to use the consumer digital wallet account as a payment method) initiated by the user device 102. For example, the risk analysis application 132 may execute the risk analysis process based on information provided by the digital token application 116, payment processing application 118, wallet account application 120, and/or any combination thereof. The risk analysis application 132 is discussed in more detail below with respect to FIGS. 2-5.

The risk server 130 may execute the other applications 134 to perform various other tasks and/or operations corresponding to the payment provider server and/or the user device 102. For example, the other applications 134 may include security applications for implementing server-side security features, programmatic client applications for interfacing with appropriate application programming interfaces (APIs) over network 150, or other types of applications. The other applications 134 may also include additional communication applications, such as email, texting, voice, and instant messaging (IM) applications that enable a user to send and receive emails, calls, texts, and other notifications through the network 150. In various embodiments, the other applications 134 may include location detection applications, such as a mapping, compass, and/or global positioning system (GPS) applications, which may be used to determine a location of the user device 102. The other applications may 134 include social networking applications. Additionally, the other applications 134 may include device interfaces and other display modules that may receive input and/or output information. For example, the other applications 134 may include a GUI configured to provide an interface to the user.

The risk server 130 may further include a database 136, which may be stored in a memory and/or other storage device of the risk server 130. The database 136 may include, for example, IDs such as operating system registry entries, cookies associated with the risk analysis application 132, biometric information, IDs associated with hardware of the network interface component 138, IDs used for payment/user/device authentication or identification, and/or other appropriate IDs. According to a particular embodiment, the database 136 may also store a merchant identifier associated with the merchant, a location identifier associated with the merchant location, and/or a POS identifier associated with the user device 102.

In various embodiments, the risk server 130 also includes at least one network interface component 138 that is configured to communicate with the payment provider server 114 via the network 150. For example, according to a particular embodiment, the risk server 130 may receive voice communication information from the user device 102 via the network interface component 138. The network interface component 138 may comprise a DSL modem, a payment provider server 114TN modem, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

The payment network 160 may be implemented as a single payment network or a combination of multiple payment networks. For example, in various embodiments, the network 160 may include one or more payment rails operated and maintained by one or more financial institutions such as VISA®, MASTERCARD®, STAR®, PULSE®, and/or the like. The payment network 160 may also include secure connections between the user device 102 the payment processor 114 and one or more payment gateways.

Figure 2:
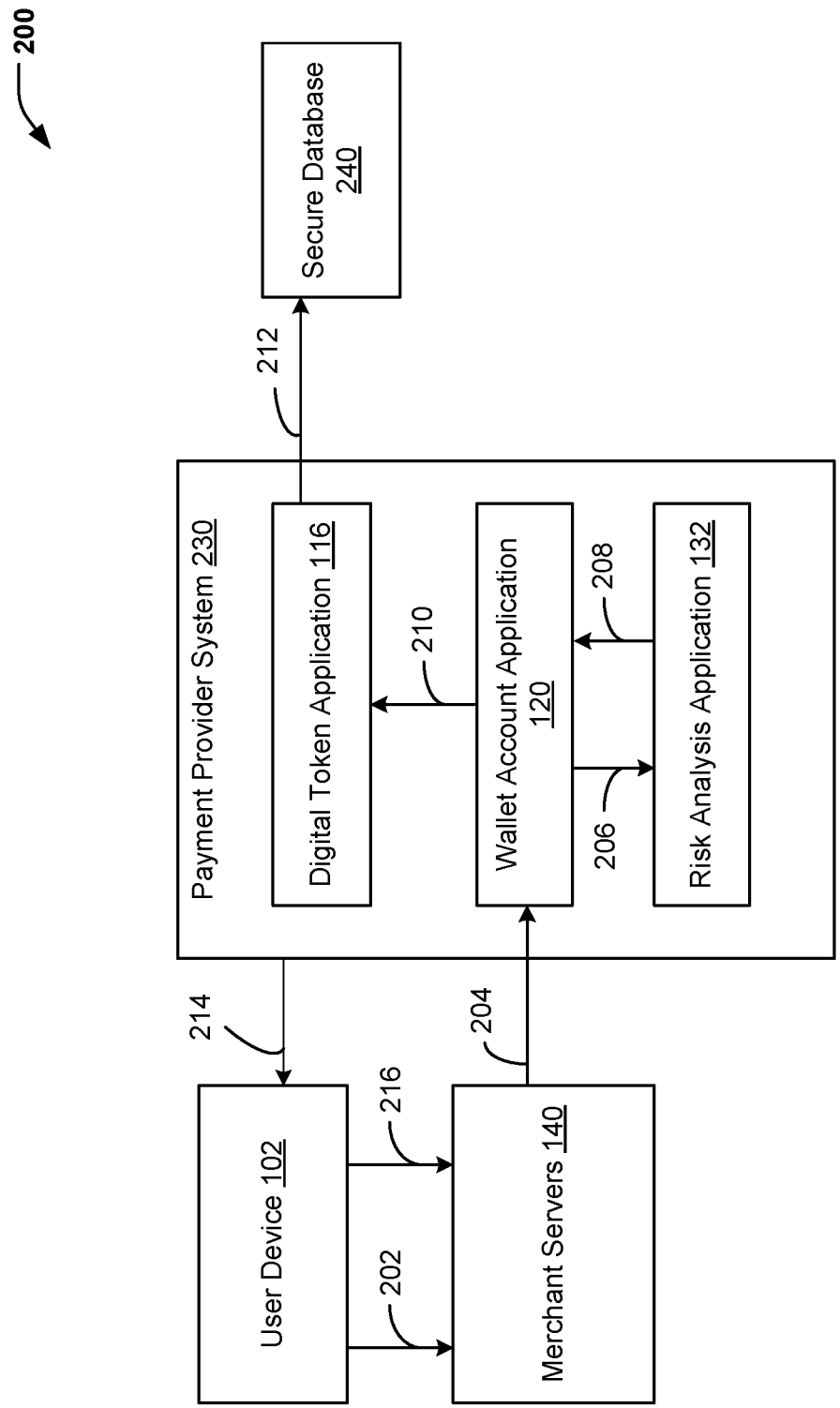
FIG. 2 is an is an example data flow diagram for generating and storing a non-transactable token, according to an embodiment.
Figure 3:
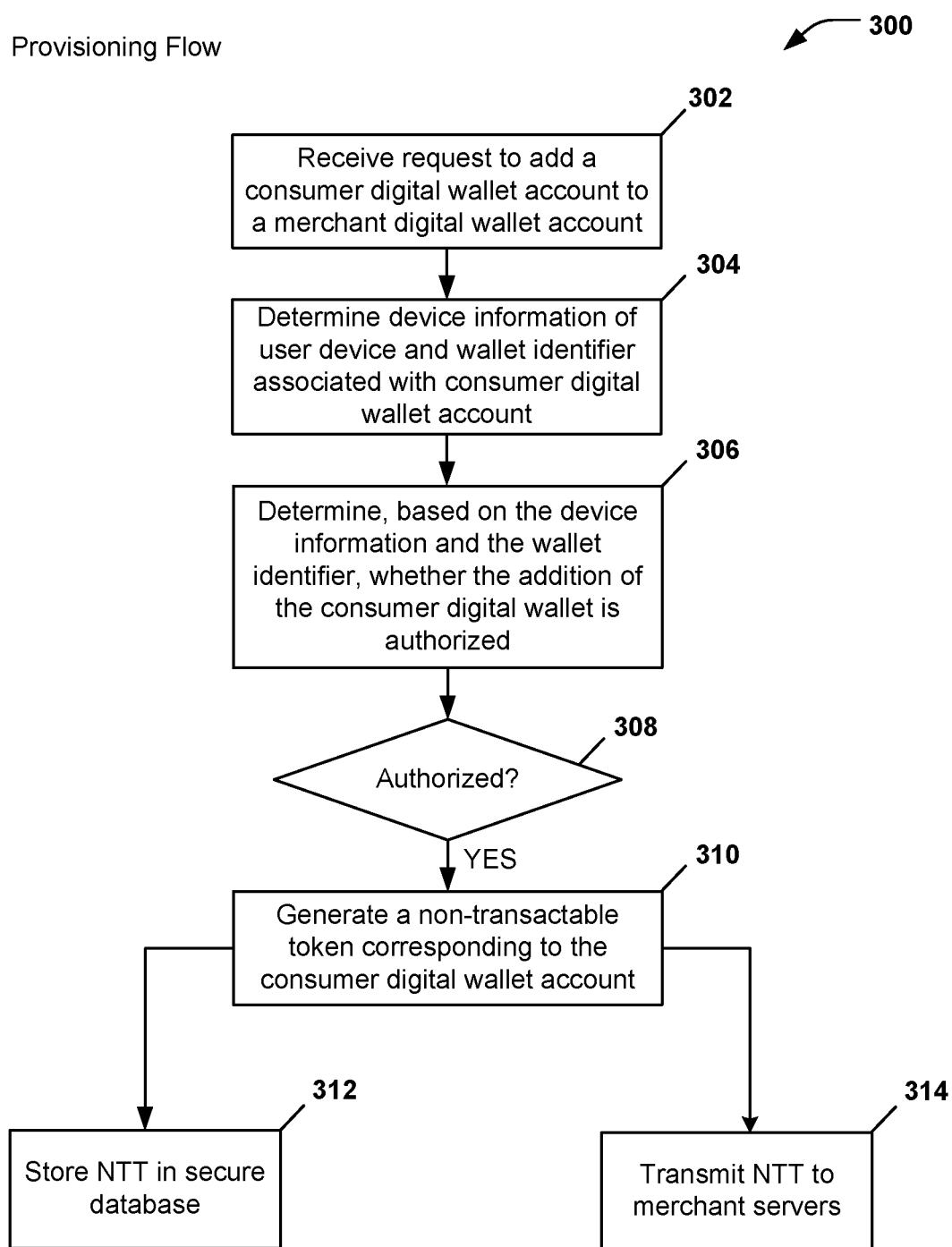
FIG. 3 is an example data flow diagram for generating and storing a non-transactable token, according to another embodiment.

FIG. 2 illustrates a data flow 200 for adding a consumer digital wallet account of a user to a merchant digital wallet account of a merchant. FIG. 3 illustrates a flow diagram of a method 300 for adding a consumer digital wallet account of a user to a merchant digital wallet account of a merchant. As such, FIG. 3 will be described in conjunction with references to elements illustrated in FIG. 2. Note that one or more steps, processes, and methods described herein may be omitted, performed in a different sequence, or combined as desired or appropriate. As previously discussed, the consumer digital wallet account may be provided to the user by the payment provider, and the merchant digital wallet account may be provided to the user by the merchant for use when the user purchases an item or other product from the merchant.

At step 302, the payment provider server 114 may receive a request to add a consumer digital wallet account to the merchant digital wallet account. For example, as shown in FIG. 2, the user device 102 may transmit a request 202 to add the consumer digital wallet account as payment method within the merchant digital wallet account for use in subsequent purchase transactions with the merchant. For example, the user device 102 may transmit the request 202 using the digital wallet application 104 provided by the merchant and stored on the user device 102. As another example, the user device 102 may transmit the request 102 via a website provided by the merchant server 140. As such, the request 202 may be transmitted in response to the user selecting (e.g., via the user device 102) the consumer digital wallet account from a plurality of payment methods offered to the user via the digital wallet application 104 and/or the website. In other embodiments, the request 202 may be transmitted by the user device via the consumer digital wallet application 105. For instance, the user may add the consumer digital wallet account as a payment method to the merchant digital wallet account from within the environment of the digital wallet application 104.

The merchant server 140 may receive the request 202, such as via the merchant wallet application 142. The merchant wallet application 142 may be configured to forward 204 the request to the payment provider system 230. According to some embodiments, the payment provider system 230 may include components from the payment provider server 114 and the risk server 130. For instance, the payment provider system 230 may include the digital token application 116 and the wallet account application 120 of the payment provider server 114 and the risk analysis application 132 of the risk server 130.

At step 304, the payment provider server 114 may determine device information of the user device 102 and a account identifier associated with the consumer digital wallet account. For instance, the wallet account application 120 may receive the forwarded request 204 from the merchant server 140, and the forwarded request 204 may include login credentials provided by the user. Based on the login credentials, the wallet account application 120 may authenticate user and determine a account identifier corresponding to the login credentials. The account identifier may be linked to and/or otherwise associated with the consumer digital wallet account provided to the user by the payment provider. In other embodiments, the forwarded request 204 itself may include the account identifier. Further, the forwarded request 204 may also include the device information associated with the user device 102. As such, the wallet account application 120 may transmit a risk analysis request 206 that includes the account identifier and the device information. As previously discussed, the device information may include model information, an operating system version, language information, a device identifier, location information, and/or the like.

At step 306, the payment provider server 114 may determine, based on the device information and the account identifier, whether the addition of the consumer digital wallet account to the merchant digital wallet account is authorized. For example, the risk analysis application 132 may receive the risk analysis request 206. Based on the account identifier and the device information included in the risk analysis request 206, the risk analysis application 132 may determine whether the addition of the consumer digital wallet account to the merchant digital wallet account is authorized. At step 308, if the risk analysis application 132 determines that the addition of the consumer digital wallet account to the merchant digital wallet account is authorized, the risk analysis application 132 may transmit an authorization indication 208 to the wallet account application 120. Further, the method may then proceed to step 310.

At step 310, the payment provider server 114 may generate a NTT corresponding to the consumer digital wallet account. For instance, in response to receiving the authorization indication 208, the wallet account application 120 may transmit a token request 210 to the digital token application 116. The digital token application 116, in response to the request, may be configured to generate the NTT. As previously noted, the NTT may represent an indication that the consumer digital wallet account has been added as a valid payment method to the merchant digital wallet account. In certain implementations, the NTT may be a randomly generated string of alphanumeric characters, although it will be appreciated by one or ordinary skill in the art that other representations of the NTT are also possible. As previously discussed, the NTT is unusable for payment and does correspond to any particular financial instrument of the user.

At step 312, the payment provider server 114 may store the NTT in a secure database. For example, the digital token application 116, in some instances, may be configured to store an association between the NTT and the account identifier in secure database 240. According to some embodiments, the secure database 240 may correspond to the database 124 of the payment provider server 114 or any other database accessible by the payment provider server 114. In addition, the secure database 240 may be inaccessible to the merchant server 140. In other words, the merchant server 140 may not have access rights to the secure database 240 and/or may be unauthorized to access the merchant server 140.

At step 314, the NTT may be transmitted to the merchant server 140. For instance, the payment provider system 230 may transmit 214 (e.g., via the payment provider server 114 or a consumer wallet provider server) the NTT to the user device 214. Further, the user device 102 may provide 216 the NTT to the merchant server 140 to be stored locally at the merchant server 140 or in a storage device associated with the merchant server 140.

Figure 4:
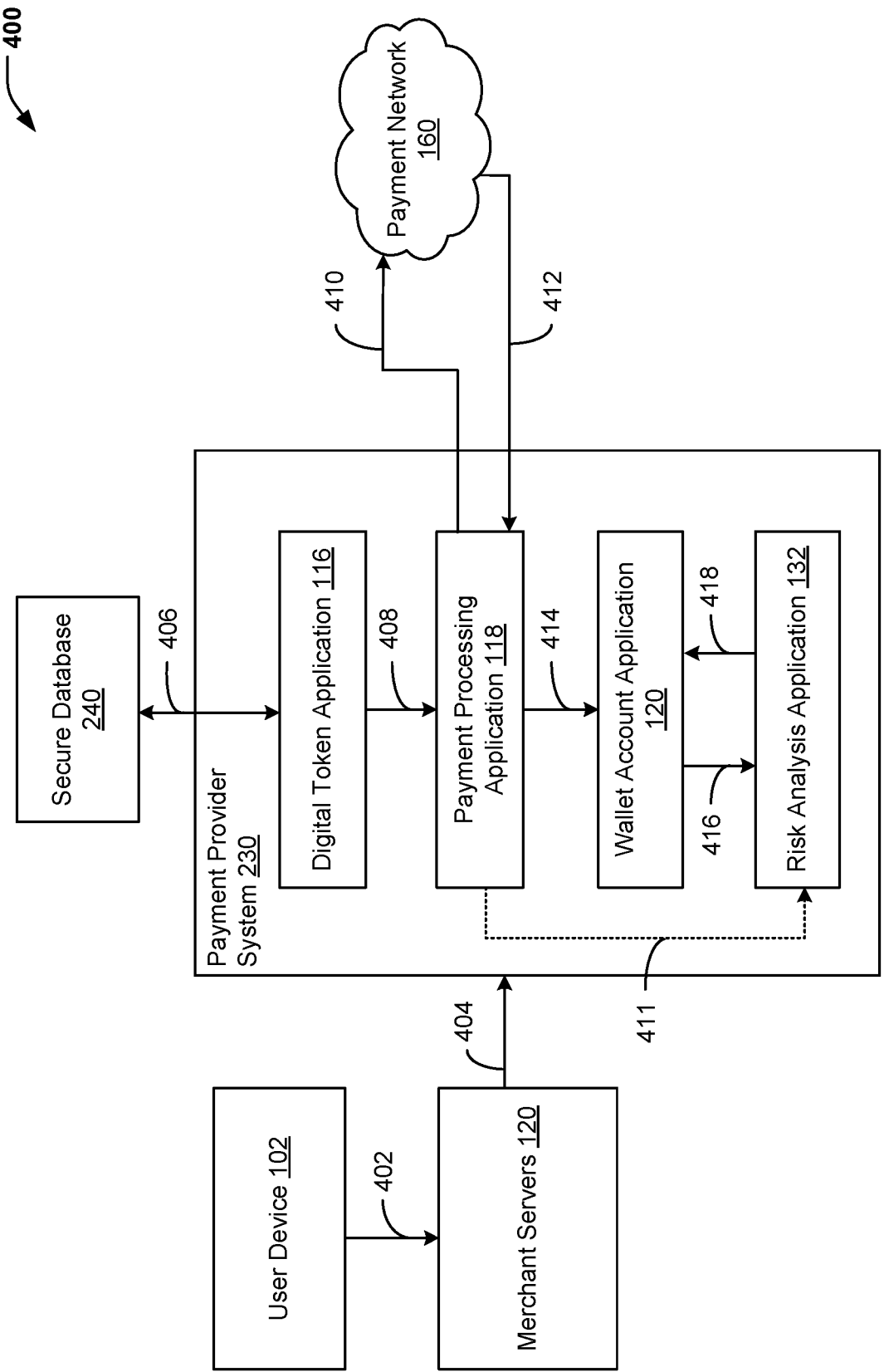
FIG. 4 is an is an example data flow diagram for using a consumer digital wallet as a payment method from within a merchant digital wallet, according to an embodiment.
Figure 5:
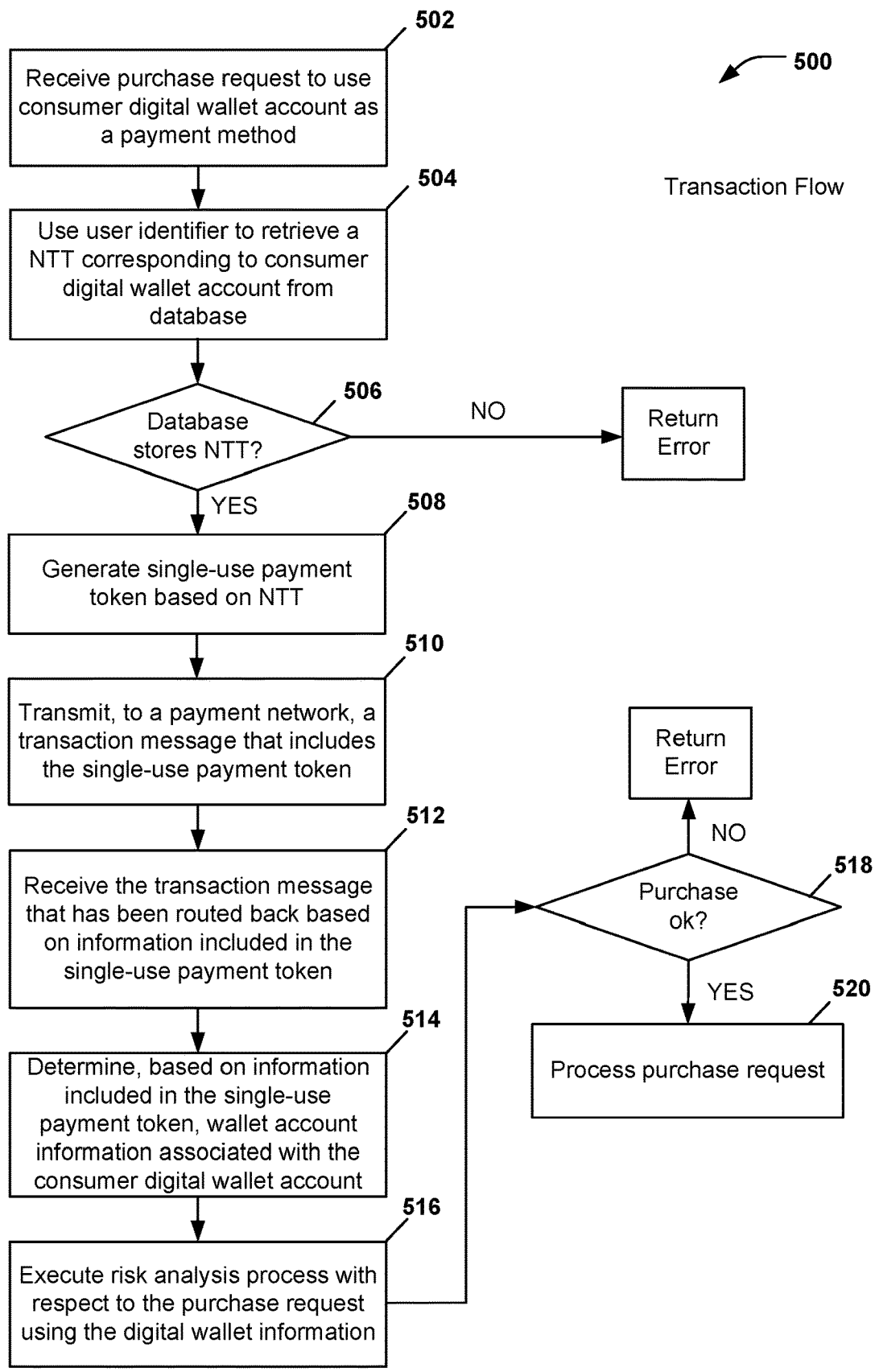
FIG. 5 is an example data flow diagram for using a consumer digital wallet as a payment method from within a merchant digital wallet, according to another embodiment

FIG. 4 illustrates a data flow 400 for selecting the consumer digital wallet account as a payment method from the merchant digital wallet account for a purchase transaction. Similarly, FIG. 5 illustrates a flow diagram 500 for selecting the consumer digital wallet account as a payment method from the merchant digital wallet account for a purchase transaction. Thus, FIG. 5 will be described in conjunction with references to elements illustrated in FIG. 4. It will be appreciated that the steps discussed with respect to FIG. 4 and FIG. 5 may be performed subsequent to adding the consumer digital wallet account to the merchant digital wallet account as previously described with reference to FIG. 2 and FIG. 3. Note that one or more steps, processes, and methods described herein may be omitted, performed in a different sequence, or combined as desired or appropriate.

At step 502, the payment provider server 114 may receive a purchase request to use the consumer digital wallet account as a payment method to pay for a product or item sold by the merchant. For instance, the user device 102 may transmit a purchase request 402 to the merchant server 140, and the merchant server 140 may forward 404 the purchase request to the payment provider system 230. In certain embodiments, the purchase request 402 may include device information associated with the user device 102 as well as the account identifier that was provided to the user by the payment provider. Further, the merchant server 140 may add additional information to the forwarded request 404, such as transaction information associated with the purchase request (e.g., information related to the item to be purchased from the merchant, a payment amount, and/or other types of transaction information) and merchant information associated with the merchant (e.g., a merchant identifier, merchant location information, and/or other types of merchant information).

At step 504, the payment provider server 114 may retrieve an NTT corresponding to the account identifier from a database. For example, the digital token application 116 may use the account identifier to retrieve 406 the NTT from the secure database 240. As previously discussed, the secure database 204 may store an association between the account identifier and the NTT and may be inaccessible to the merchant or merchant server 140. In certain embodiments, the account identifier may be used as an index into a table that stores multiple associations between different NTTs and different account identifiers.

At step 506, the payment provider server 114 may determine whether the NTT is in fact stored in the secure database 240, and if so, the method 500 may proceed to step 508. Otherwise, an error may be returned to the payment provider server 114 and forwarded to the merchant server 140 and/or user device 102.

At step 508, the payment provider server 114 may generate a single-use payment token based on the NTT. For instance, the digital token application 116 may generate a single-use payment token based on the NTT. According to one or more embodiments, the single-use payment token may include a bank identification number (BIN) corresponding to the payment provider and/or payment provider server 114. Additionally, an association between the single-use payment token and the NTT may be stored in the secure database 240. As a result, the secure database 240 may store associations between the single-use payment token, the NTT, and the account identifier. Further, it will be appreciated that the single-use payment token may be a digital cryptographic token that can be used for a single payment transaction (e.g., the payment transaction corresponding to the purchase request of the user to purchase the item from the merchant). After processing the payment transaction, the single-use payment transaction may remain unsuable for subsequent payment transactions.

At step 510, the payment provider server 114 may transmit, to a payment network, a transaction message that includes the single-use payment token. For example, the digital token application 116 may provide 408 the single-use payment token to the payment processing application 118, and the payment processing application 118 may generate the transaction message that includes the single-use payment token. The payment processing application 118 may then transmit 410 the transaction message to the payment network 160. In some embodiments, the transaction message may correspond to a credit/debit card transaction message (e.g., an ISO 8583 authorization message). Further, the payment network 160 may be an existing card payment network that routes credit/debit card transaction messages to the appropriate devices.

In embodiments where transaction message corresponds to a credit/debit card transaction message, the digital token application 116 may generate the transaction message to include dummy card account information. For example, the transaction message may include a dummy expiration date, a dummy card verification value (CVV) number, other types of credit card information, and/or a combination thereof. Thus, the transaction message may mimic a credit/debit card transaction message, and the payment network 160 may be able to process the transaction message as a normal credit/debit card transaction.

According to other embodiments, prior to or concurrently with transmitting the transaction message to the payment network 160, the payment processing application 118 may cache 411 certain transaction information and merchant information with the risk analysis application 132 to be used during execution of a subsequent risk analysis process (e.g., as discussed with respect to step 516 below). The transaction information may include, but is not limited to, information related to the user/buyer, account details of the user/buyer, transaction amount, currency, transaction type (e.g., whether the transaction is an authorization transaction or a sale transaction), and a payment type. The merchant information may include, but is not limited to, information corresponding to merchant identifiers, merchant accounts, and merchant location. As an example, the payment processing application 118 may associate a unique identifier with the transaction information and the merchant information. To this end, the payment processing application 118 may generate the unique identifier by using a hash function to calculate a hash value based on the single-use payment token and the dummy card account information. Further the payment processing application 118 may store and/or cache the association between the unique identifier (e.g. the hash value) and the transaction and merchant information with the risk server 130, such as in the databased 136 or another storage component in communication with the risk analysis application 132.

At step 512, the payment provider server 114 may receive the transaction message that has been routed back to the payment provider server 114 based on information included in the single-use payment token. For instance, based on the BIN included in the single-use payment token, the transaction message may be routed 412 from the payment network 160 back to the payment provider server 114 (e.g., the payment processing application 118). For example, the payment network 160 may perform a lookup to a routing table using the BIN and determine that the transaction message is to be routed to the payment provider server 114 based on the lookup.

At step 514, the payment provider server 114 may determine, based on information included in the single-use payment token, wallet account information associated with the consumer digital wallet account. For instance, the payment processing application 118 may identify, based on de-tokenizing the single-use payment token, certain information that includes, but is not limited to, a second unique identifier, the account identifier corresponding to the consumer digital wallet account, and user information related to the user. According to some embodiments, the second unique identifier may be a second hash value calculated by the payment processing application 118 using the same hash function used to calculate the hash value that was previously cached and associated with the transaction information and merchant information. As such, after the transaction message is routed back to the payment provider server 114, the payment processing application 118 may calculate the second hash value by applying the hash function to the single-use payment token and the dummy card account information that was included in the transaction message. Additionally, the payment processing application 118 may determine the account identifier based on the association between the single-use payment token, the NTT, and the account identifier stored in the secure database 240.

Further, the payment processing application 118 may provide 414 the information resulting from the detokenization of the single-use payment token (e.g., the second unique identifier, the account identifier, and/or the user information) to the wallet account application 120. The wallet account application 120 may determine whether access to the consumer digital wallet account is authorized, and if so, the wallet account application 120 may determine, based on the account identifier, wallet account information corresponding to the consumer digital wallet account. The wallet account information may indicate a default payment method for the user that has been selected from a plurality of payment methods of the user stored in the consumer digital wallet account. The wallet account information may also include other information related to the consumer digital wallet account, such as transaction history of the user's usage of the consumer digital wallet account and other types of information. Furthermore, the wallet account information, the second unique identifier, the user information, or a combination thereof may be provided 414 to the wallet account application 120.

As previously discussed, the wallet account application 120 may be executed by a different server than the payment provider server 114. For example, the wallet account application 120 may be executed by the consumer wallet provider server dedicated to managing the consumer digital wallet account of various users of the payment provider. To this end, the payment processing application 118 may transmit the information resulting from the detokenization of the single-use payment token to the consumer wallet provider server. The consumer wallet provider server may then determine the wallet account information from the detokenized information and provide the wallet account information to the risk server 130, as detailed in step 516.

At step 516, a risk analysis process with respect to the purchase request may be executed using the wallet account information. In certain embodiments, in addition to using the wallet account information, the risk analysis process may also be executed using the cached transaction information and merchant information and the user information. For example, the risk analysis application 132 of the risk server 130 may determine that the second unique identifier is equal to the unique identifier that was previously cached with the transaction information and the merchant information in the database 136. For instance, the second unique identifier may be the second hash value, and the risk analysis application 132 may determine that the second hash value is equal to the previously calculated and cached hash value. Based on this determination, the risk analysis application 132 may access the transaction information and the merchant information associated with the previously calculated and cached hash value.

At step 518, the payment provider server 114 may determine, based on the risk analysis process, whether to proceed with the processing the purchase transaction. For example, based on executing the risk analysis process, the risk analysis application 132 may determine a risk profile associated with the purchase transaction. Further, the risk analysis application 132 may determine whether the risk profile satisfies a risk threshold. If the risk profile satisfies the risk threshold, the method 500 may proceed to step 520, in which the purchase request is processed. Otherwise an error may returned and transmitted to the merchant server 140 and/or user device 102 indicating that the purchase transaction could not be processed.

At step 520, the purchase request is processed, thereby causing funds to remitted from a financial account of the user to a financial account of the merchant.

Figure 6:
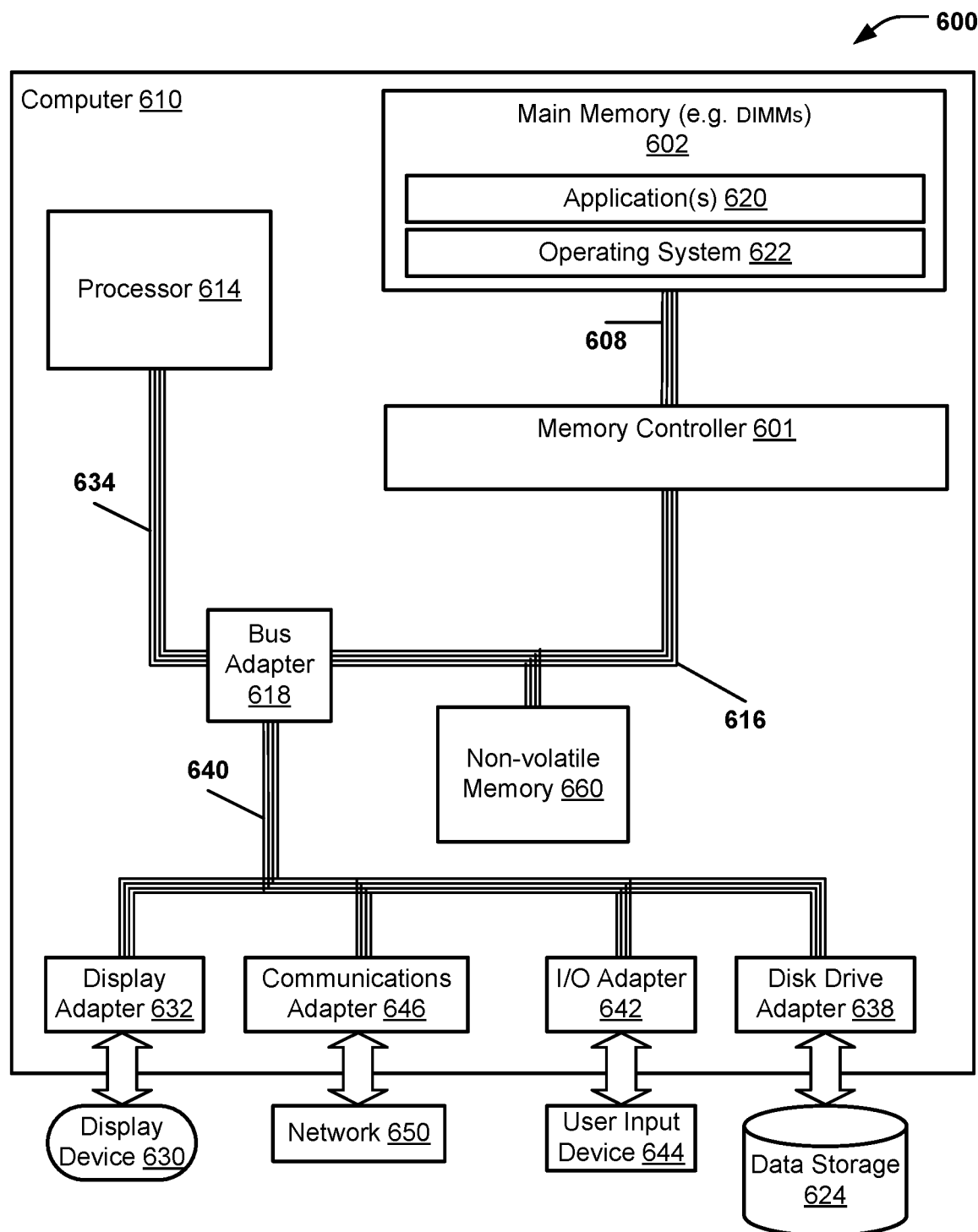
FIG. 6 is a block diagram of a computer system suitable for implementing one or more components in FIG. 1-5, according to an embodiment.

FIG. 6 is a block diagram of a computer system 600 suitable for implementing one or more components in FIG. 1, according to an embodiment. Referring to FIG. 6, an illustrative system 600 including a computer 610 is shown. The computer 610 may be an implementation of a computing system that includes or corresponds to the user device 102, the payment provider server 114, the risk server, and/or the merchant server 140 of FIG. 1. The computer 610 includes at least one computer processor (CPU) 614 (e.g., a hardware processor) as well as main memory 602, a memory controller 601, and a non-volatile memory 660. The main memory 602 is connected through a memory bus 608 to the memory controller 601. The memory controller 601 and the non-volatile memory 660 are connected through a second memory bus 616 and a bus adapter 618 to the processor 614 through a processor bus 634.

Stored at the memory 602 are one or more applications 620 that may be module(s) or computer program instructions for carrying out particular tasks (e.g., the digital wallet application 104, consumer digital wallet application 105, social media feed application 106, digital token application 116, payment processing application 118, wallet account application 120, risk analysis application, and merchant wallet application 142 of FIG. 1). Also stored at the main memory 602 is an operating system 622. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 622 and the application 620 in the example of FIG. 5 are shown in the main memory 602, but components of the aforementioned software may also, or in addition, be stored at non-volatile memory (e.g., on data storage, such as data storage 624 and/or the non-volatile memory 660).

The computer 610 includes a disk drive adapter 638 coupled through an expansion bus 640 and the bus adapter 618 to the processor 614 and other components of the computer 610. The disk drive adapter 638 connects non-volatile data storage to the computer 610 in the form of the data storage 624 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 624 may store the data and information described herein.

The computer 610 also includes one or more input/output ("I/O") adapters 642 that implement user-oriented input/output through, for example, software drivers and computer hardware for controlling input and output to and from user input devices 644, such as keyboards and mice. In addition, the computer 610 includes a communications adapter 646 for data communications with a data communications network 660. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 646 implements the hardware level of data communications through which one computer sends data communications to another computer, directly or through a data communications network. Examples of the communications adapter 646 suitable to use in the computer 610 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 610 also includes a display adapter 632 that facilitates data communication between the bus adapter 618 and a display device 630, enabling the application 620 to visually present output on the display device 630.

In various embodiments of the present disclosure, execution of instruction sequences to practice the present disclosure may be performed by computer system 600. In various other embodiments of the present disclosure, a plurality of computer systems 600 coupled by communications adapter 646 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method, comprising:
generating, by a payment provider system using a software function associated with the payment provider system, a first digital token for a first digital wallet of a user, wherein the first digital token is not configured to be used as payment for an electronic transaction with a seller entity, wherein the first digital token designates the first digital wallet as validly registered with the payment provider system;
storing, by the payment provider system, the first digital token to a database;
receiving, by the payment provider system, a payment request for the electronic transaction with the seller entity, the payment request including a first digital wallet identifier corresponding to the first digital wallet, and the first digital wallet corresponding to a plurality of payment methods included in a second digital wallet;
retrieving, by the payment provider system based on the first digital wallet being validly registered, the first digital token from the database independent of the seller entity obtaining the first digital token for the payment request;
determining an existing electronic payment network usable by the seller entity and the payment provider system for processing of the electronic transaction;
generating, by the payment provider system, a second digital token configured for use as payment for the electronic transaction with the seller entity, the second digital token generated based on the first digital token and the software function associated with the payment provider system, and the second digital token is further generated to prevent revealing the first digital token to the seller entity, wherein the second digital token comprises routing information that enables the existing electronic payment network to route an electronic transaction message back to the payment provider system;
determining a message format required for authorizations of electronic transactions over the existing electronic payment network;
generating, by the payment provider system, the electronic transaction message comprising the second digital token in the message format required;
transmitting, to the existing electronic payment network by the payment provider system, the electronic transaction message comprising the second digital token;
receiving, by the payment provider system based on the routing information from the second digital token, the electronic transaction message from the existing electronic payment network;
determining, by the payment provider system, the digital wallet identifier based on the second digital token from the electronic transaction message; and
based on the digital wallet identifier and the receiving the electronic message, processing, by the payment provider system, the payment request for the electronic transaction with the seller entity, wherein the second digital token is rendered unusable for further use after the processing of the payment request for the electronic transaction with the seller entity.

2. The method of claim 1, further comprising:
performing a transaction risk analysis for the electronic transaction based on the digital wallet identifier, wherein processing the payment request is based on a result of the transaction risk analysis.

3. The method of claim 1, wherein the electronic transaction message includes a bank identification number (BIN) that corresponds to the payment provider system.

4. The method of claim 1, wherein the electronic transaction message includes an artificial payment identifier to place the electronic transaction message in the message format required by the existing electronic payment network.

5. The method of claim 1, wherein the first digital wallet comprises a plurality of different payment instruments, and wherein the message format emulates an existing mechanism for card transactions on the existing electronic payment network.

6. The method of claim 5, wherein the plurality of different payment instruments include two or more of the following types of payment instruments: a credit card, a debit card, a gift card, an internal balance with a payment provider for the payment provider system, a balances with another payment provider, a coupon, an electronic check, a cryptocurrency, or an incentive.

7. The method of claim 1, wherein the software function comprises a hashing function.

8. The method of claim 1, further comprising:
determining a default payment method corresponding to first digital wallet, wherein processing the payment request comprises using the default payment method to complete the electronic transaction.

9. A computer system, comprising:
a processor; and
a non-transitory computer-readable medium having stored thereon instructions executable to cause the computer system to perform operations comprising:
generating, using a software function associated with the computer system, a first digital token for a first digital wallet of a user, wherein the first digital token is not configured to be used as payment for an electronic transaction with a seller entity, wherein the first digital token designates the first digital wallet as validly registered with the computer system;
storing the first digital token to a database;
receiving a payment request for the electronic transaction with the seller entity, the payment request including a first digital wallet identifier corresponding to the first digital wallet, and the first digital wallet corresponding to a plurality of payment methods included in a second digital wallet;
retrieving, based on the first digital wallet being validly registered, the first digital token from the database independent of the seller entity obtaining the first digital token for the payment request;
determining an existing electronic payment network usable by the seller entity and the payment provider s stem for processing of the electronic transaction;
generating a second digital token configured for use as payment for the electronic transaction with the seller entity, the second digital token generated based on the first digital token and the software function associated with the computer system, and the second digital token is further generated to prevent revealing the first digital token to the seller entity, wherein the second digital token comprises routing information that enables the existing electronic payment network to route an electronic transaction message back to the computer system;
determining a message format required for authorizations of electronic transactions over the existing electronic payment network;
generating the electronic transaction message comprising the second digital token in the message format required;
transmitting, to the existing electronic payment network, the electronic transaction message comprising the second digital token;
receiving, based on the routing information from the second digital token, the electronic transaction message from the existing electronic payment network;
determining the digital wallet identifier based on the second digital token from the electronic transaction message; and
based on the digital wallet identifier and the receiving the electronic message, determining whether to approve or deny the payment request for the electronic transaction with the seller entity, wherein the second digital token is rendered unusable for further use after the processing of the payment request for the electronic transaction with the seller entity.

10. The computer system of claim 9, wherein the operations further comprise:
performing a transaction risk analysis for the electronic transaction based on the digital wallet identifier, wherein processing the payment request is based on a result of the transaction risk analysis.

11. The computer system of claim 9, wherein the electronic transaction message corresponds to an International Organization for Standardization (ISO) 8583 authorization message.

12. The computer system of claim 9, wherein the first digital wallet comprises a plurality of different payment instruments, including at least one payment instrument that is not included in the second digital wallet, and wherein the message format emulates an existing mechanism for card transactions on the existing electronic payment network.

13. The computer system of claim 9, wherein the operations further comprise:
determining a default payment method corresponding to first digital wallet, wherein processing the payment request comprises using the default payment method to complete the electronic transaction.

14. The computer system of claim 9, wherein the software function comprises a hashing function.

15. A non-transitory computer-readable medium having stored thereon instructions that are executable by a computer system to cause the computer system to perform operations comprising:
generating, using a software function associated with the computer system, a first digital token for a first digital wallet of a user, wherein the first digital token is not configured to be used as payment for an electronic transaction with a seller entity, wherein the first digital token designates the first digital wallet as validly registered with the computer system;
storing the first digital token to a database;
receiving a payment request for the electronic transaction with the seller entity, the payment request including a first digital wallet identifier corresponding to the first digital wallet, and the first digital wallet corresponding to a plurality of payment methods included in a second digital wallet;
retrieving, based on the first digital wallet being validly registered, the first digital token from the database independent of the seller entity obtaining the first digital token for the payment request;
determining an existing electronic payment network usable by the seller entity and the payment provider system for processing of the electronic transaction;
generating a second digital token configured for use as payment for the electronic transaction with the seller entity, the second digital token generated based on the first digital token and the software function associated with the computer system, and the second digital token is further generated to prevent revealing the first digital token to the seller entity, wherein the second digital token comprises routing information that enables the existing electronic payment network to route an electronic transaction message back to the computer system;
determining a message format required for authorizations of electronic transactions over the existing electronic payment network;
generating the electronic transaction message comprising the second digital token in the message format required;

transmitting, to the existing electronic payment network, the electronic transaction message comprising the second digital token;

receiving, based on the routing information from the second digital token, the electronic transaction message from the existing electronic payment network;

determining the digital wallet identifier based on the second digital token from the electronic transaction message; and based on the digital wallet identifier and the receiving the electronic message, determining whether to approve or deny the payment request for the electronic transaction with the seller entity wherein the second digital token is rendered unusable for further use after the processing of the payment request for the electronic transaction with the seller entity.

16. The non-transitory computer-readable medium of claim 15, wherein the operations further comprise:

performing a transaction risk analysis for the electronic transaction based on the digital wallet identifier, an amount of the electronic transaction, and a type of payment instrument in the first digital wallet, wherein processing the payment request is based on a result of the transaction risk analysis.

17. The non-transitory computer-readable medium of claim 15, wherein the first digital wallet comprises a plurality of different payment instruments, including at least one payment instrument that is not included in the second digital wallet, and wherein the message format emulates an existing mechanism for card transactions on the existing electronic payment network.

18. The non-transitory computer-readable medium of claim 15, wherein the operations further comprise:

determining a default payment method corresponding to first digital wallet, wherein processing the payment request comprises using the default payment method to complete the electronic transaction.

19. The non-transitory computer-readable medium of claim 15, wherein the first digital wallet comprises a plurality of different payment instruments.

20. The non-transitory computer-readable medium of claim 19, wherein the plurality of different payment instruments include one or more of the following types of payment instruments: a credit card, a debit card, a gift card, an internal balance with a payment provider for the payment provider system, a balances with another payment provider, a coupon, an electronic check, a cryptocurrency, or an incentive.

* * * * *

UNITED STATES PATENT AND TRADEMARK OFFICE
CERTIFICATE OF CORRECTION

| | |
|---|---|
| PATENT NO. | : 11,880,825 B2 |
| APPLICATION NO. | : 17/490518 |
| DATED | : January 23, 2024 |
| INVENTOR(S) | : Prashant Jamkhedkar et al. |

It is certified that error appears in the above-identified patent and that said Letters Patent is hereby corrected as shown below:

In the Claims

Claim 9, Column 21, Line 34, change "s stem for processing" to --system for processing--.

Signed and Sealed this
Nineteenth Day of March, 2024

Katherine Kelly Vidal
*Director of the United States Patent and Trademark Office*